United States Patent
Patti

[11] B 3,916,306
[45] Oct. 28, 1975

[54] METHOD AND APPARATUS FOR TESTING HIGH CIRCUIT DENSITY DEVICES

[75] Inventor: Michael Joseph Patti, Poughkeepsie, N.Y.

[73] Assignee: International Business Machines Corporation, Armonk, N.Y.

[22] Filed: Sept. 6, 1973

[21] Appl. No.: 394,712

[44] Published under the Trial Voluntary Protest Program on January 28, 1975 as document no. B 394,712.

[52] U.S. Cl. .................. 324/73 R; 235/153 AC
[51] Int. Cl.² ................................ G01R 31/00
[58] Field of Search ................ 324/73; 235/153 AC

[56] References Cited
UNITED STATES PATENTS

| | | | |
|---|---|---|---|
| 3,253,134 | 5/1966 | North, Jr. ..................... | 324/73 X |
| 3,490,041 | 1/1970 | Shapiro et al. ................. | 324/73 |
| 3,614,608 | 10/1971 | Giedd et al. ................... | 324/73 |
| 3,621,387 | 11/1971 | Smith et al. ................... | 324/73 |

Primary Examiner—Alfred E. Smith
Assistant Examiner—Rolf Hille
Attorney, Agent, or Firm—Wesley De Bruin

[57] ABSTRACT

Apparatus and method for testing complex electronic circuitry including in particular solid state semiconductor devices. Generation of worst case stressing patterns for the testing of Large Scale Integration devices is accomplished by varying the values of the "ones" and "zeros" of a test pattern impressed on the device under test. All or any portion of the "ones" are either at a "Most Positive UP Level" (M.P.U.L.) or at a "Least Positive UP Level" (L.P.U.L.). Correspondingly all or any portion of the "zeros" are either at a "Least Negative Down Level" (LNDL) or at a "Most Negative Down Level" (MNDL).

An alternative embodiment of the invention permits fluctuation between MPUL and LPUL for all, or any portion, of the "ones" during the steady state time periods of the test pattern, and permits fluctuation between LNDL and MNDL for all, or any portion of the "zeros" during the steady state time periods of the test pattern.

At an appropriate time during each of the steady state time periods of the test pattern, the output of the device under test is compared with the expected output from the device under test and a Pass/Fail manifestation is made by the test system. The Pass/Fail 2 manifestation is a composite signal containing a Pass/Fail designation as to the output of each output terminal of the device under test. The Pass/fail manifestation together with data relative to the Hi/Lo status of each input pin and test pattern step is stored, or at least made available for storage, during each step of a test pattern. This data may be printed out for analysis, or may be processed by the controller. It will be appreciated that the test data and test results may be utilized in conjunction with one or more diagnostic programs for analysis.

30 Claims, 10 Drawing Figures

* GENERAL
** FOR TEST PATTERN DATA "1"

ALTERNATIVE EMBODIMENT

TIMING DIAGRAM FOR ALTERNATIVE
EMBODIMENT OF FIG. 5A

METHOD AND APPARATUS FOR TESTING HIGH CIRCUIT DENSITY DEVICES

FIELD OF THE INVENTION

The invention relates to a logic test system and more specifically to a system for testing highly complex functional logic circuitry of the type encountered in large scale integration.

DESCRIPTION OF THE PRIOR ART AND BACKGROUND OF THE INVENTION

The prior art concerns itself with testing various electronic devices by comparing the response of a known good reference device with that of a device under test.

A further characteristic of the circuitry to be tested is that the projected yield rates are relatively low resulting in a very high reject rate during testing. Furthermore, the large number of individual circuit part numbers precludes specialized test system tailor-made to each individual circuit part number. Cost considerations even preclude the use of a test system with a large number of individual sophisticated programs for each part number. Considerations of cost and time prohibit detailed optical examination of each logic circuit. Furthermore, for purposes of speed and efficiency it is desirable to test components on a real-time basis. Presently known testers are incapable of testing complex functional logic circuitry of this type by subjecting them to real-time "worst case" stressing patterns as taught and disclosed by applicant's invention.

One of the most significant developments in recent years in the area of electrical circuit fabrication is that of Large Scale Integration (L.S.I.) in which a great number of circuits, including a great number and variety of components, are fabricated on a single chip of semiconductor material. This technique has been facilitated by the subsequent development of Metal Oxide Silicon (MOS) and Metal Thick Oxide Silicon (MTOS) fabrication techniques.

In such integrated circuit units, the chip which supports the integrated circuits is enclosed in a suitable casing provided with a number of pins for connection to external circuits. The connections between such pins and the input and output terminals of the integrated circuit are formed by very thin metallic wires soldered to the pins and the proper pads of the integrated circuit. Complex electronic apparatus for processing, or transmitting data comprise a great number of such integrated circuit units; it is thus necessary to be able to check the correct operation of the integrated units.

Large Scale Integration permits the system designer to package a great number of circuits in a relatively small volume. These circuits have the significant advantages of operating at low levels of power dissipation and at high operating (e.g., switching) rates. As a result, L.S.I. circuits have found wide acceptance, for example as logic and memory circuits in digital computer systems and the like. The reliability of such systems depends greatly on the reliability and accuracy of operation of the component circuits, and thus a need has arisen for new and sophisticated equipment and procedures for testing L.S.I. circuits. Such testing is relatively difficult because of the great number of difficult functional sections in each circuit, and because of the many different operating parameters which must be checked. To completely evaluate the operation of a given circuit it must be subjected to both static and dynamic tests and measurements. These tests include leakage tests and functional tests, the latter being particulary useful in the testing of logic circuits to determine whether or not the circuit being tested performs its desired logic operation upon an input signal. In a functional test, which may be either combinational or sequential, a known signal is applied to one or more of the circuit inputs, and the actual circuit output signal is checked to determine whether it conforms to the output signal that the circuit should correctly produce in response to the specified input signal.

In the performance of these tests, it is desirable that the circuit be operated at or near its normal operating conditions with respect to load, power supply, and in the case of a logic circuit, clock signals. It has been found desirable to test the circuit under conditions herein termed the "worst case". "Worst case" condition may be defined as conditions deviating materially from the desired normal or so-called "nominal" operating conditions of the circuit. "Worst case conditions" may be further defined as conditions under which the circuit is still expected, required or desired, by design, to render fully acceptable performance.

In accordance with applicant's invention worst case stressing patterns for logic circuits using a random level setting technique are employed. As will be more apparent from the following description the worst case stressing patterns employing applicant's random level setting technique of this invention is not to be confused with "Monte Carlo" pattern generation. The worst case stressing pattern of this invention employs the application of logical "ones" or "zeros" to the input of a device under test. The "ones" will be randomly at either the "Most Positive UP Level" or the "Least Positive UP Level" and the "zeros" will be randomly at either the "Most Negative Down Level" or the "Least Negative Down Level". These levels, namely MPUL, LPUL, MNDL and LNDL are referred to hereinafter as the critical values of the input signal. The device under test must satisfactorily operate in response to a sizeable number of patterns consisting of these critical values in order to be acceptable. It is desired to test a circuit under the most stringent combination of these worst case conditions, that is, to obtain a fully acceptable output from the device even when the inputs are marginally "good".

For a single input circuit, such as an Inverter, worst case testing is merely MPUL or LPUL for a one, depending upon the technology and MNDL or LNDL for a zero. For a multiple input circuit such as, a single AND or OR; or a combination of AND's, OR's, INVERTERS, etc., it requires analysis to determine for each input pattern of the truth table, which combination of MPUL, LPUL, MNDL and LNDL will stress the device under test in the most desirable fashion, that is worst case. It will be appreciated that as the truth table progresses, a given input may require MPUL Or MNDL in one pattern and LPUL or LNDL in a successive pattern.

For a relatively simple logic circuit, one with relatively few inputs or of relatively low circuit density, the test truth table is not complex and the required analysis for worst case testing is readily manageable.

However, where circuit densities and input lines are of the quantities utilized in large Scale Integration (L.S.I.) the analysis approaches astronomical values as to the number of test patterns required to exhaust the truth table. In fact it approaches the impossible from a practical viewpoint to effectively and efficiently test Large Scale Integration devices by the prior art methods. The presently utilized testing methods for testing LSI are severely limited in the ability to apply test patterns having worst case levels. These test methods propose to use fixed levels, with all the inputs having the same value (i.e., one of MPUL or LPUL and all zeros having the same value (MNDL or LNDL) for a given pass through the truth table. It has further been proposed that a second pass be made through the truth table in an attempt to stress the Device Under Test (D.U.T.) in the opposite direction: To clarify, if the first pass through the truth table was made with ones at LPUL and zeros at LNDL then the next pass will be made with MPUL and MNDL respectively. Obviously, there are two other combinations that could be applied: LPUL/MNDL and MPUL/LNDL. None of these really apply the optimum stress for all of the truth table steps; therefore, the above proposed solutions are compromises at best.

SUMMARY OF THE INVENTION

Applicant's novel and inventive test apparatus and method overcomes the limitations of the prior art and accomplishes the efficient and effective testing of Large Scale Integration devices. The method and apparatus employed by applicant to practice his invention is set forth in summary as follows: The truth table for typical L.S.I. logic requires that upwards of tens of thousands of patterns be applied to the device under test (D.U.T.). In many cases hundreds of thousands of test pattern steps are required. Applicant's invention provides that each pin driving circuit be designed such that its output state has two values each for logical one and logical zero. These values are: MPUL and LPUL for logical one and MNDL and LNDL for logical zero. Each pin driver is programmed with two inputs. The first input determines if the pin driver output is a one or a zero as directed and predetermined by the test program for the device under test (D.U.T.) for each test step. The second input determines that the driver output, for whatever logical state one or zero it is programmed for, will have a low value (LPUL Or MNDL) or a high value (MPUL or LNDL).

The determination of either the logical one or logical zero at the respective driver outputs is dictated by a predetermined test program, whereas the High or Low value for each driver output at each test step is made to occur at random and independently from other driver outputs. Worst case stressing of all input circuits in this manner now becomes very highly probable, considering the large number of test steps required to test typical L.S.I. devices and structures. The foregoing is the primary objective of applicant's invention. The probability of worst case stressing of all input circuits increases as the number of test steps increase in number.

By system design and the design of the pin driver circuits, the driver outputs may be made to fluctuate between MPUL and LPUL for logical one, and LNDL and MNDL for logical zero, during the steady state conditions of one and zero respectively. The preferred embodiment of applicant's invention utilizes a driver design employing latches, whereby a steady state driver output of one of the following states MPUL, LPUL, LNDL or MNDL is provided. However, it is to be appreciated that certain devices to be tested may be effectively tested by permitting fluctuation during "steady state", namely, between the limits of one (MPUL, LPUL); or between the limits of zero (LNDL, MNDL). This approach offers the additional benefit of subjecting the Device Under Test (D.U.T.) to noisy ones and zeros, and is described hereinafter as an alternative embodiment.

It is to be appreciated that the number of I/O pins, for the typical L.S.I. device is in the order of ten to three hundred and the number of I/O pins for the typical structure including a plurality of L.S.I. device is in the order of two hundred to three thousand. Applicant's invention will effectively test devices having the foregoing number of I/O pins.

It is a primary object of the invention to provide an improved Large Scale Integration Testing Method and apparatus for efficiently and effectively testing Large Scale Integration Devices.

It is a further object of the invention to provide a method for testing Large Scale Integration Devices, wherein the method includes the subjecting of the Large Scale Integration Device under test to worst case stressing patterns.

It is a further object of the invention to provide apparatus for subjecting the Large Scale Integration Device under test to worst case stressing patterns.

It is a further object of the invention to provide a novel testing method wherein the generating of worst case input conditions for testing mutliple input logic networks containing high density logic is accomplished by employing a random level setting technique.

It is a further object of the invention to provide means for impressing on an electronic device under test a test pattern including a number of steps, each said step including a plurality of discrete electrical manifestations of logical ones and logical zeros and wherein the electrical manifestations of said ones and said zeros, respectively, are caused in a random manner to assume worst case electrical manifestations of said ones. and worst case electrical manifestations of said zeros.

It is a further object of this invention to provide a method for testing multiple input logic networks containing high density logic, said method employing at least one test pattern having a plurality of steps, each step comprising a pattern of electrical manifestations of predetermined electrical characteristics, said method including a random technique whereby said predetermined electrical characteristics of said electrical manifestations are respectively randomly varied in a predetermined manner.

It is a further object of this invention to provide apparatus for testing an electrical device having n input terminals, said apparatus including means for impressing discrete electrical manifestations respectively on each of said n input terminals, and additional means for modifying certain of said electrical manifestations.

It is a further object of this invention to provide an improved tester for testing Large Scale Integration Devices having n input terminals, where n is any integer falling within the range of one hundred to three thousand, said tester including means for impressing discrete electrical manifestations representing either a logical one or a logical zero on each of said n inputs, and additional means for randomly modifying said electrical manifestations in a prescribed manner, whereby said device under test is subjected to worst case input conditions and thereby said device under test is more rigorously tested.

It is a further object of this invention to provide an improved tester for testing Large Scale Integration Devices having m input terminals, where m is an integer greater in magnitude than ten, said tester having means for impressing on each of said m input terminals an electrical manifestation of either a logical one or a logical zero, and additional means for modifying said electrical manifestations of said logical ones and logical zeros whereby said logical ones are respectively at either a first or second positive electrical potential and said logical zeros are respectively at either a first or second negative potential.

It is a further object of this invention to provide an improved tester for testing Large Scale Integration Devices having *m* input terminals, where *m* is an integer greater in magnitude than 10, said tester having means for impressing on each of said m input terminals an electrical manifestation of either a logical one or a logical zero and random means for randomly varying the electrical characteristics of all, or a portion of, said logical one electrical manifestations and said logical zero electrical manifestations, respectively, whereby said Large Scale Integration Device under test is more fully electrically stressed and thereby more efficiently and effectively tested.

It is a further object of this invention to provide an improved tester for testing Large Scale Integration Devices having m input terminals where m is an integer greater in magnitude than ten, said tester having means for randomly applying to certain of said m input terminals discrete electrical manifestations having a varying in time positive electrical potential and to said remaining m input terminals discrete electrical manifestations having a varying in time negative potential.

It is an object of this invention to provide an improved tester for LSI logic devices, said tester having a plurality of pin driving circuits, each pin driving circuit being designed to deliver two values for logical one and two values for logical zero, the values for logical one being MOST POSITIVE UP LEVEL and LEAST POSITIVE UP LEVEL, and the values for logical zero being MOST NEGATIVE DOWN LEVEL and LEAST NEGATIVE DOWN LEVEL, each said pin driver circuit adapted to receive two inputs, the first input of each said pin driver circuit designating the output thereof as a logical one or a logical zero as dictated by the test program for the device under test, the second input of each said pin driver circuit causing the output thereof to be a lower value (LPUL of MNDL) or a higher value (MPUL or LNDL) whereby a discrete electrical manifestation of a logical one is represented by either MPUL Or LPUL where a logical one is called for by said test program, and a discrete electrical manifestation of a logical zero is represented by either LNDL or MNDL where a logical zero is called for by said test program.

It is an object of the invention to provide improved pin driver circuit means for use in a Large Scale Integration device tester.

It is an object of this invention to provide an improved pin driver circuit for use in a Large Scale Integration device tester where the output of the driver circuit provides as a discrete electrical output manifestation, under control of a test program, one and only one of at least four possible discrete electrical manifestations.

It is an object of this invention to provide an improved pin driver circuit for use in a tester of multiple input logic networks containing high density logic, the output of said pin driver circuit, under control of a test program being adapted to fluctuate between a first and a second steady-state electrical condition, or between a third and a fourth steady-state electrical condition.

It is an object of this invention to provide an improved tester for testing multiple input electronic devices wherein no additional analysis, programming, or information storage is required over the devices known to the art in order to achieve desired worst case stressing patterns.

It is a still further object of this invention to provide an improved tester for testing large scale integration devices having m input terminals, where m is an integer greater in magnitude then ten, said tester having first means for providing m electrical manifestations, said first means being adapted to randomly apply a first, or a second electrical manifestation on each of certain ones of said m input terminals and said first means being adapted to randomly apply a third, or a fourth electrical manifestation on each of the remaining ones of said m input terminals, and additional means cooperating with said first means for sensing and storing an indication as to which one of said four electrical manifestations has been impressed on each of said m terminals.

It is a still further object of this invention to provide an improved tester for testing large scale integration devices having m input terminals, where m is an integer greater in magnitude than ten, said tester having first means for providing m electrical manifestations, said first means being adapted to apply a first electrical manifestation varying in magnitude in a prescribed manner, on each of certain ones of said m input terminals and said first means being further adapted to apply a second electrical manifestation varying in magnitude in a prescribed manner on each of the remaining ones of said m input terminals.

BRIEF DESCRIPTION OF THE DRAWINGS

In FIG. 2 logic one is depicted as a plus voltage and logic zero is depicted as a negative voltage. This representation is illustrative. Logic one may be a plus voltage and logic zero a less positive voltage; or logic one may be a plus voltage and logic zero be ground or zero potential.

Likewise logic one may be ground or zero potential and logic zero a negative potential; or logic one may be a negative voltage and logic zero a more negative voltage. All depending upon the particular technology used and conventions established thereto. It will be apparent that the electrical manifestation for a logical one and a logical zero must be such that electrical devices can discrminate between the two.

Likewise other electrical manifestations may be employed in a similar manner, for example current.

Figure 1:
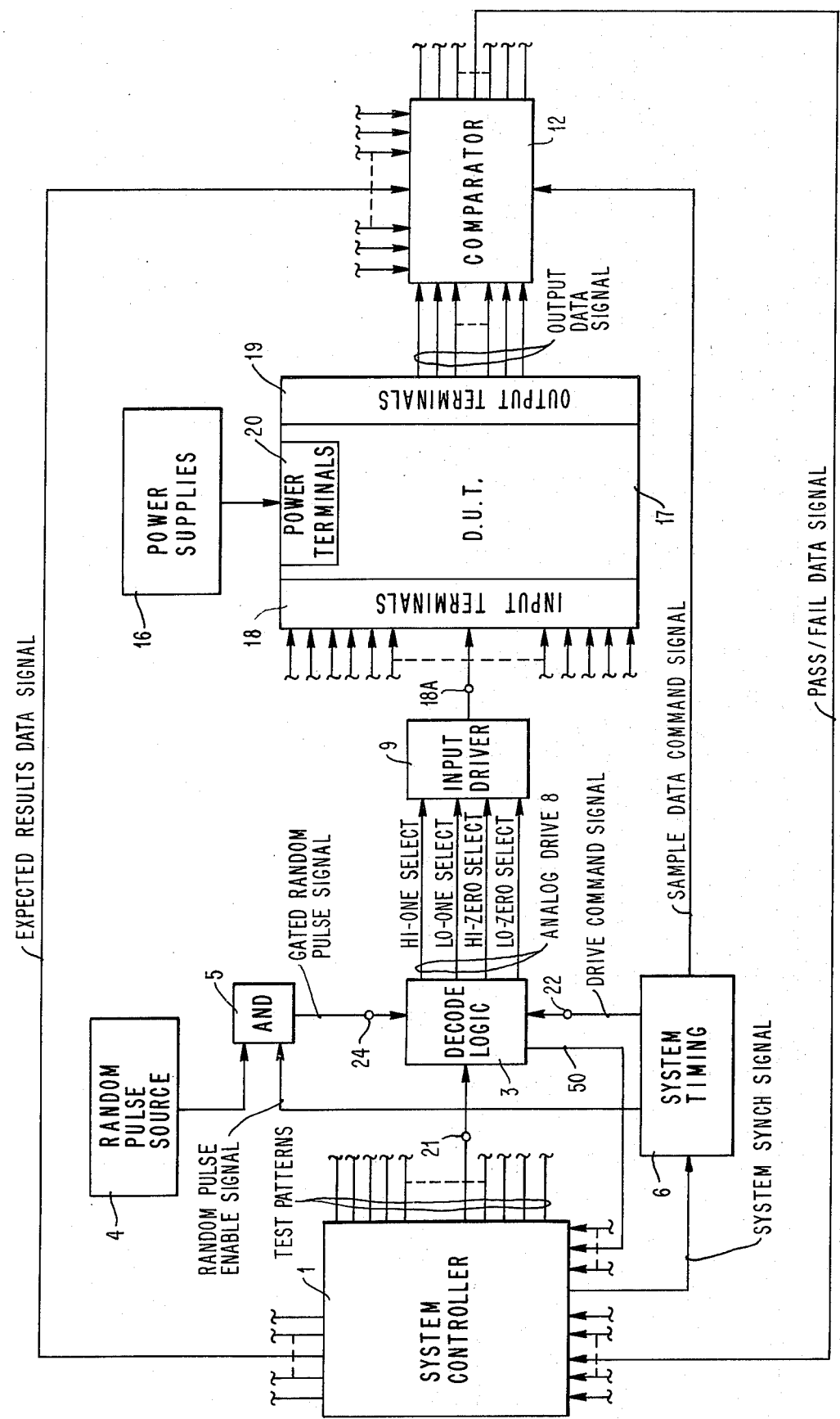
FIG. 1 is a block diagram of one embodiment of the invention.
Figure 2:
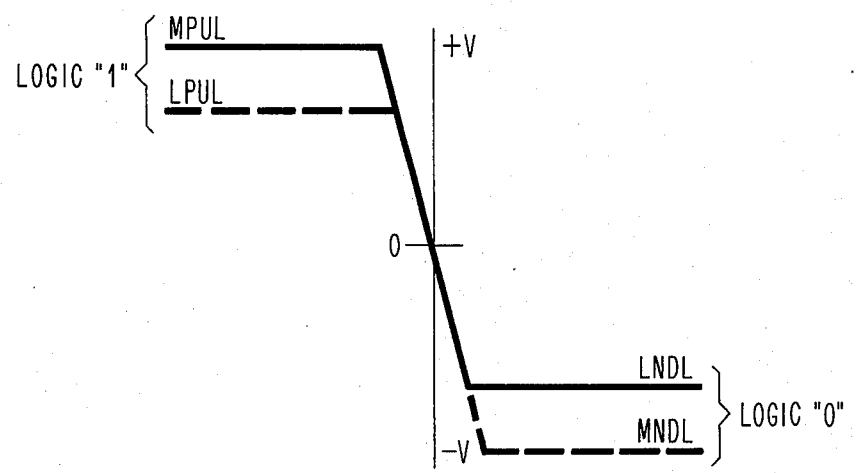
FIG. 2 is an idealized representation of electrically manifesting a logical one by one of two stats (MPUL or LPUL) and a logical zero by one of two states (LNDL or MNDL).
Figure 3A:
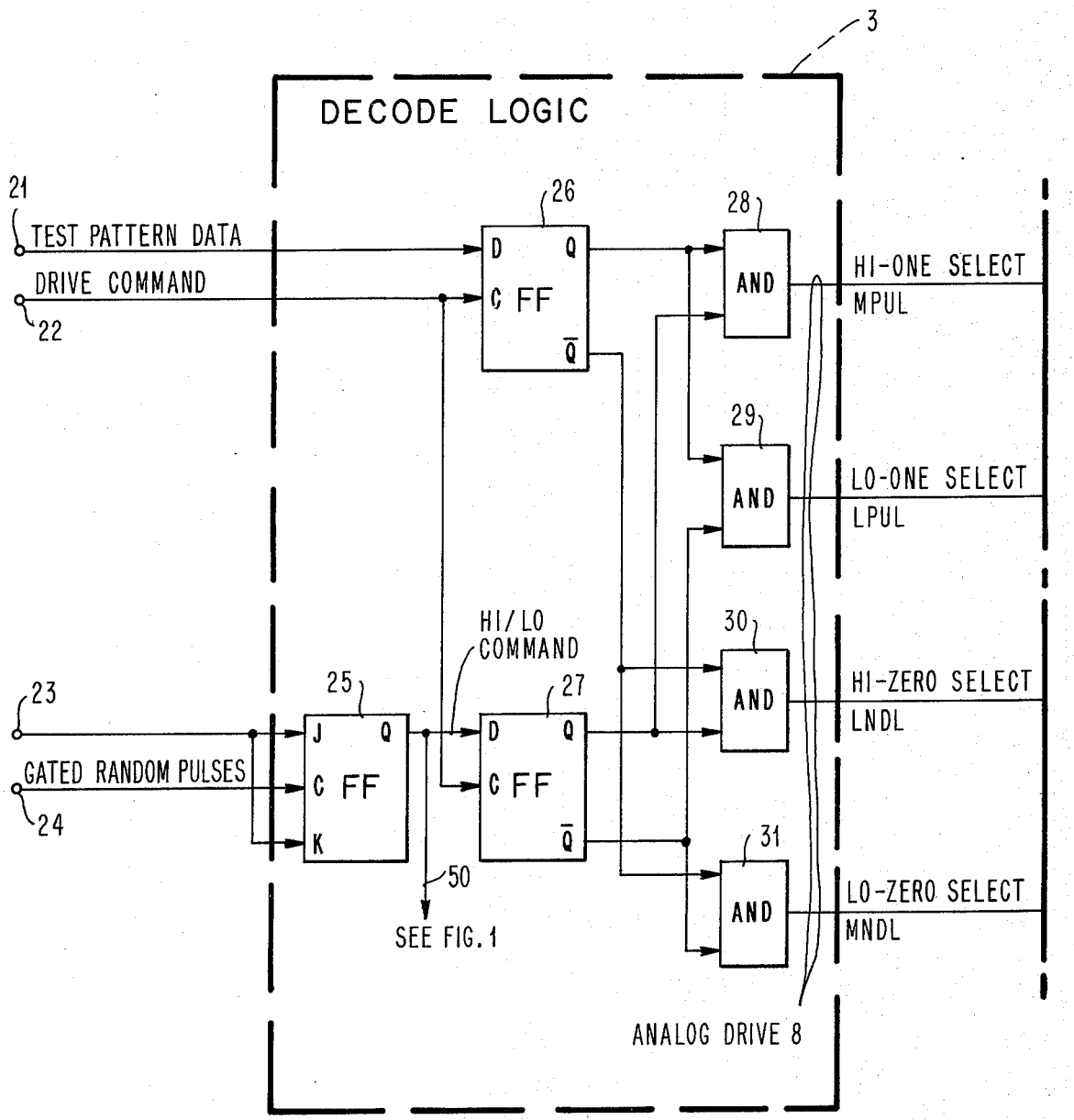
Figure 3B:
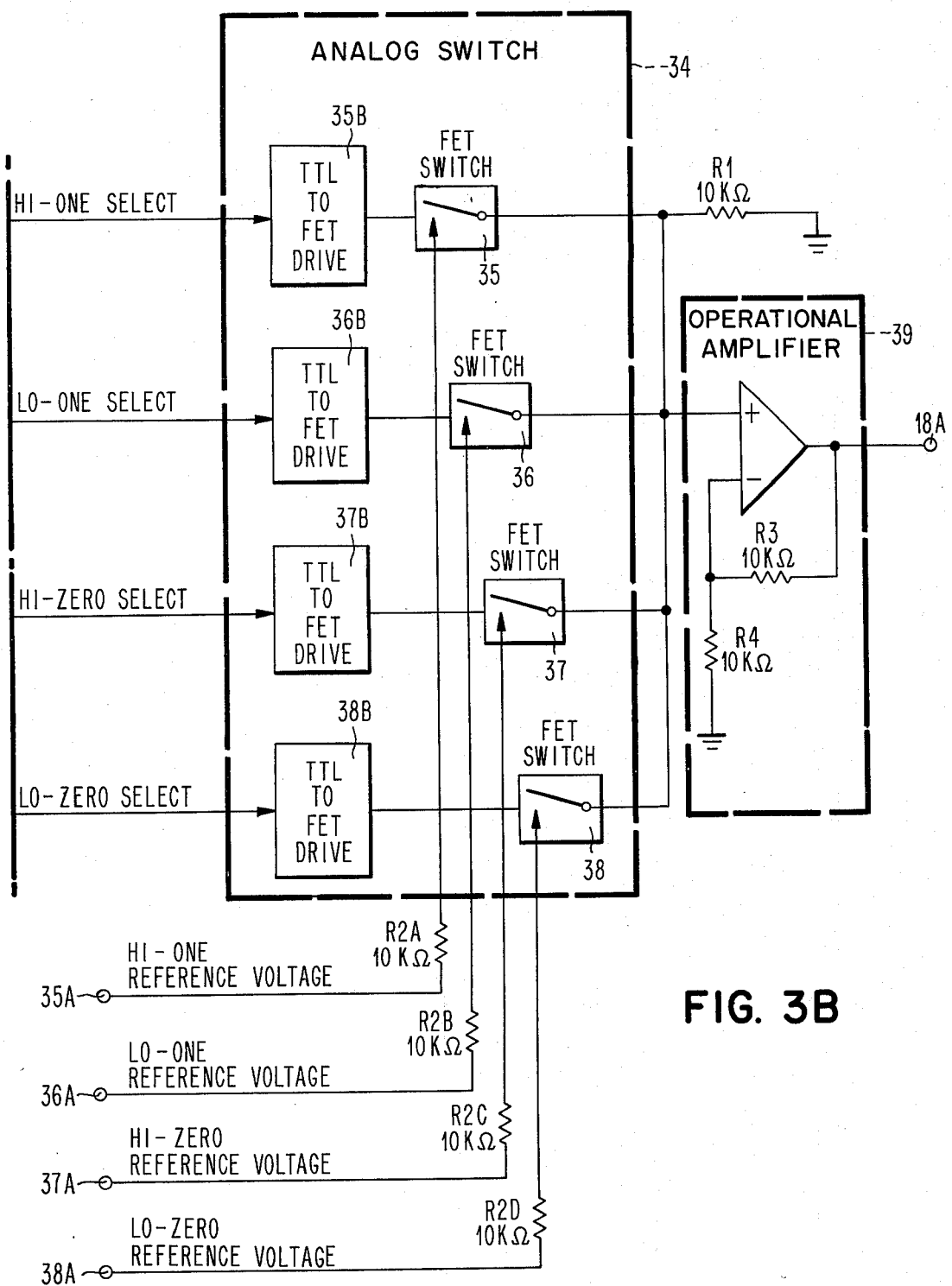

FIG. 3 discloses how FIGS. 3A and 3B are to be placed together to disclose the novel decode logic and novel input driver for one input terminal of the D.U.T., of the system of FIG. 1.

FIG. 3A discloses the novel Decode Logic employed per input terminal of the D.U.T., of the system of FIG. 1.

FIG. 3B discloses the novel Input Driver employed per input terminal of the D.U.T. of the system of FIG. 1.

Figure 4:
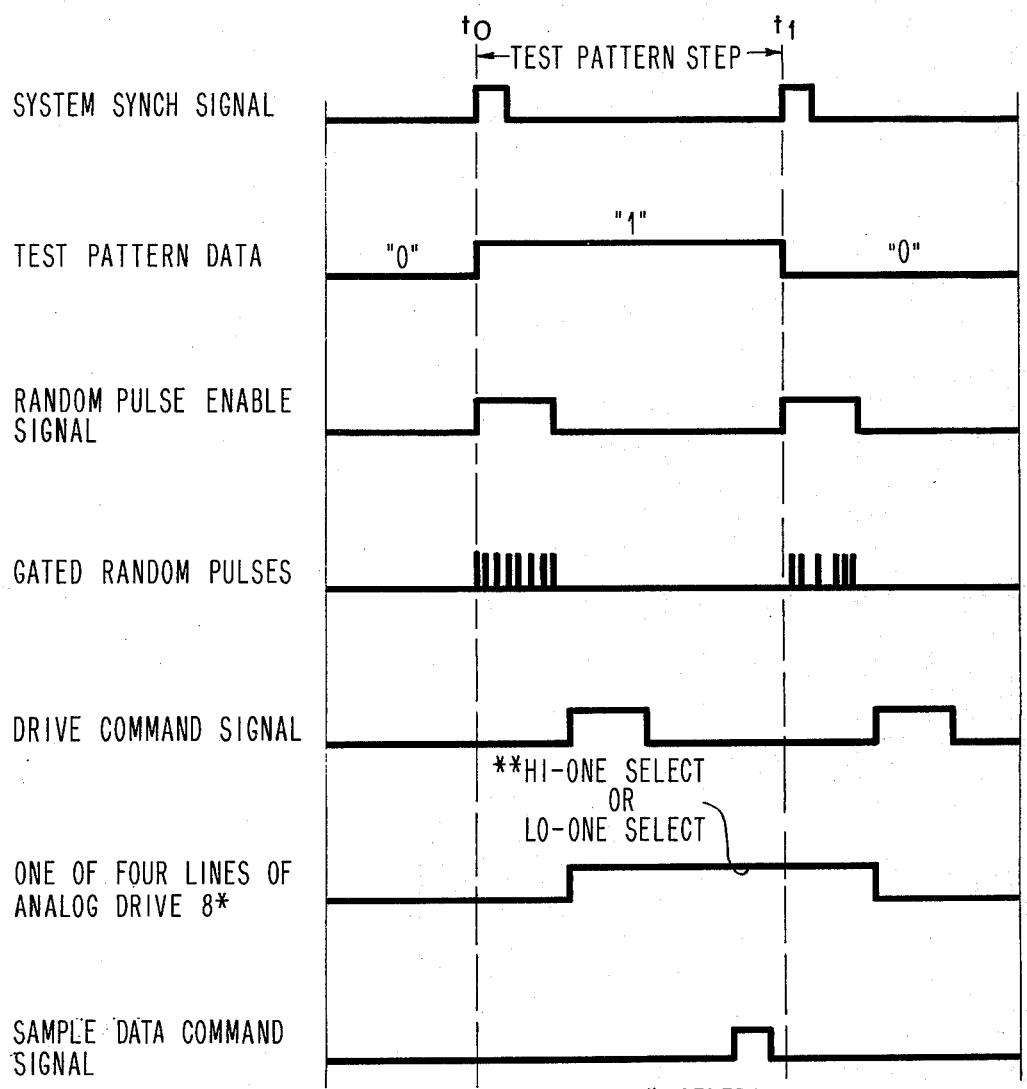

FIG. 4 is a system timing diagram to be viewed in conjunction with the preferred embodiment of the system of FIG. 1.

Figures 5, 5A:
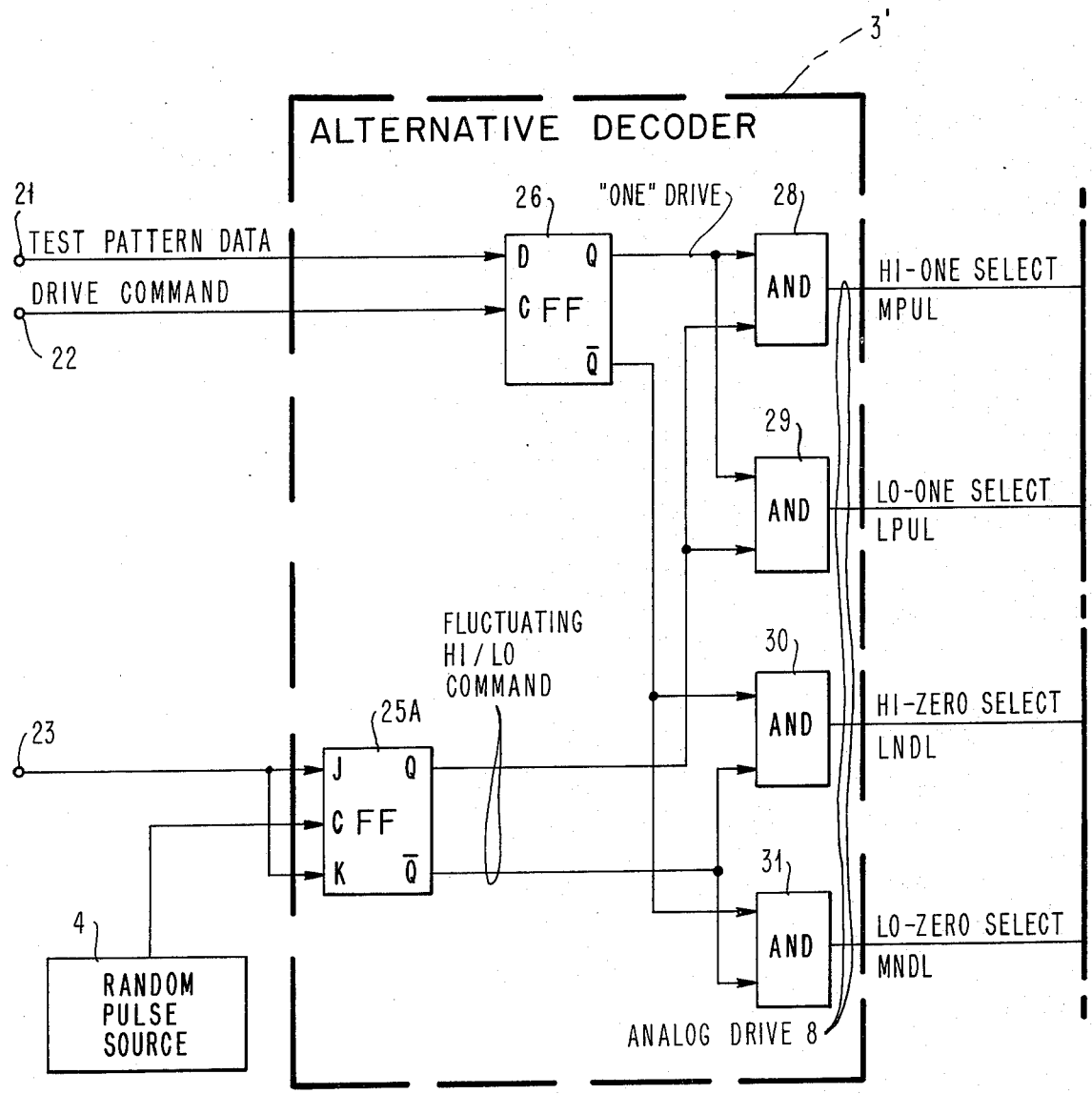

FIG. 5A shows how FIGS. 5 and 3B are to be placed together to disclose novel Pin Driver Circuit structure that may be employed to practice an alternative embodiment of the invention.

Figure 6:
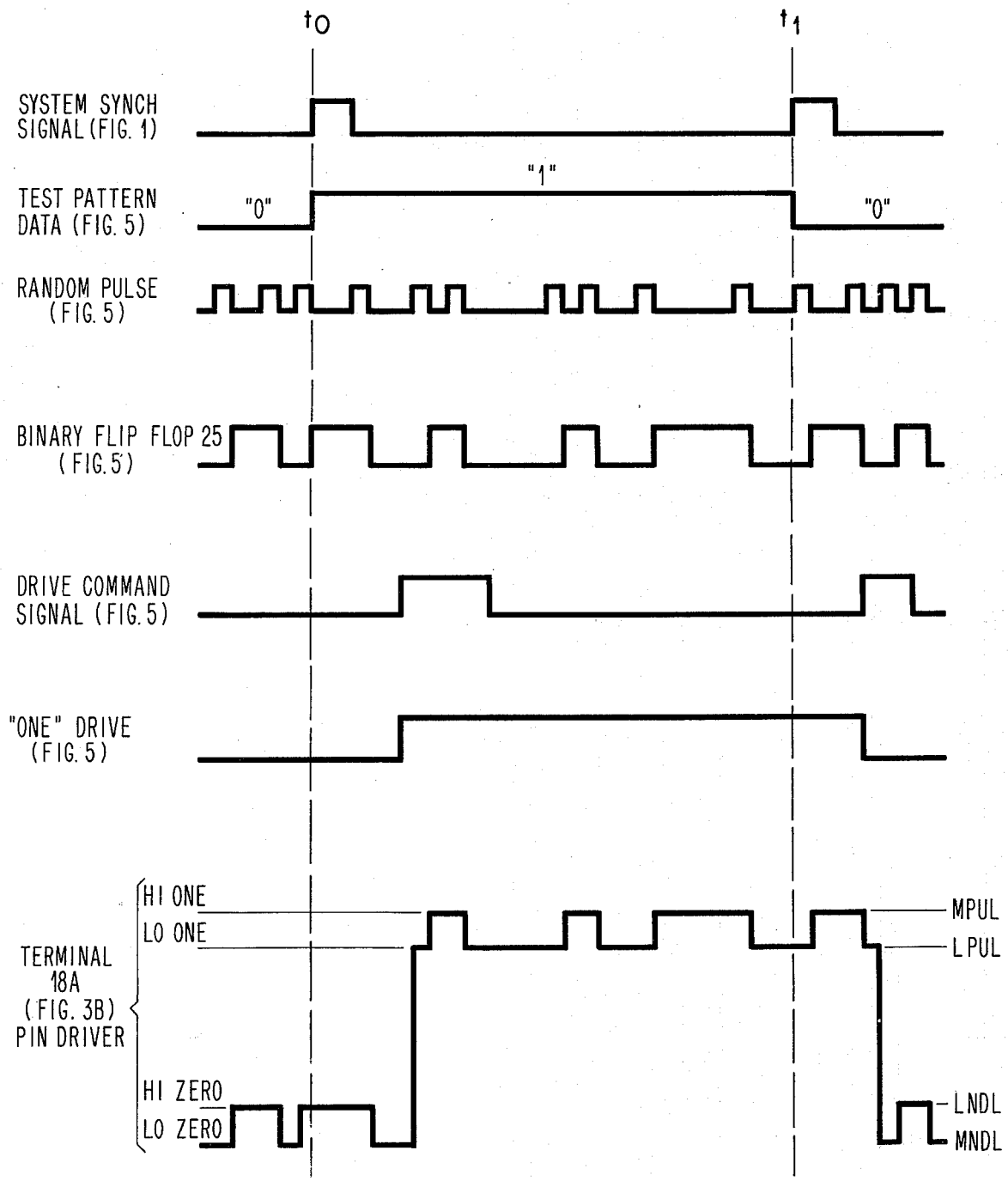

FIG. 6 is a system timing diagram to be viewed in conjunction with a first alternative embodiment of the invention, represented in FIGS. 1, 3B, 5, and 5A.

Figure 7:
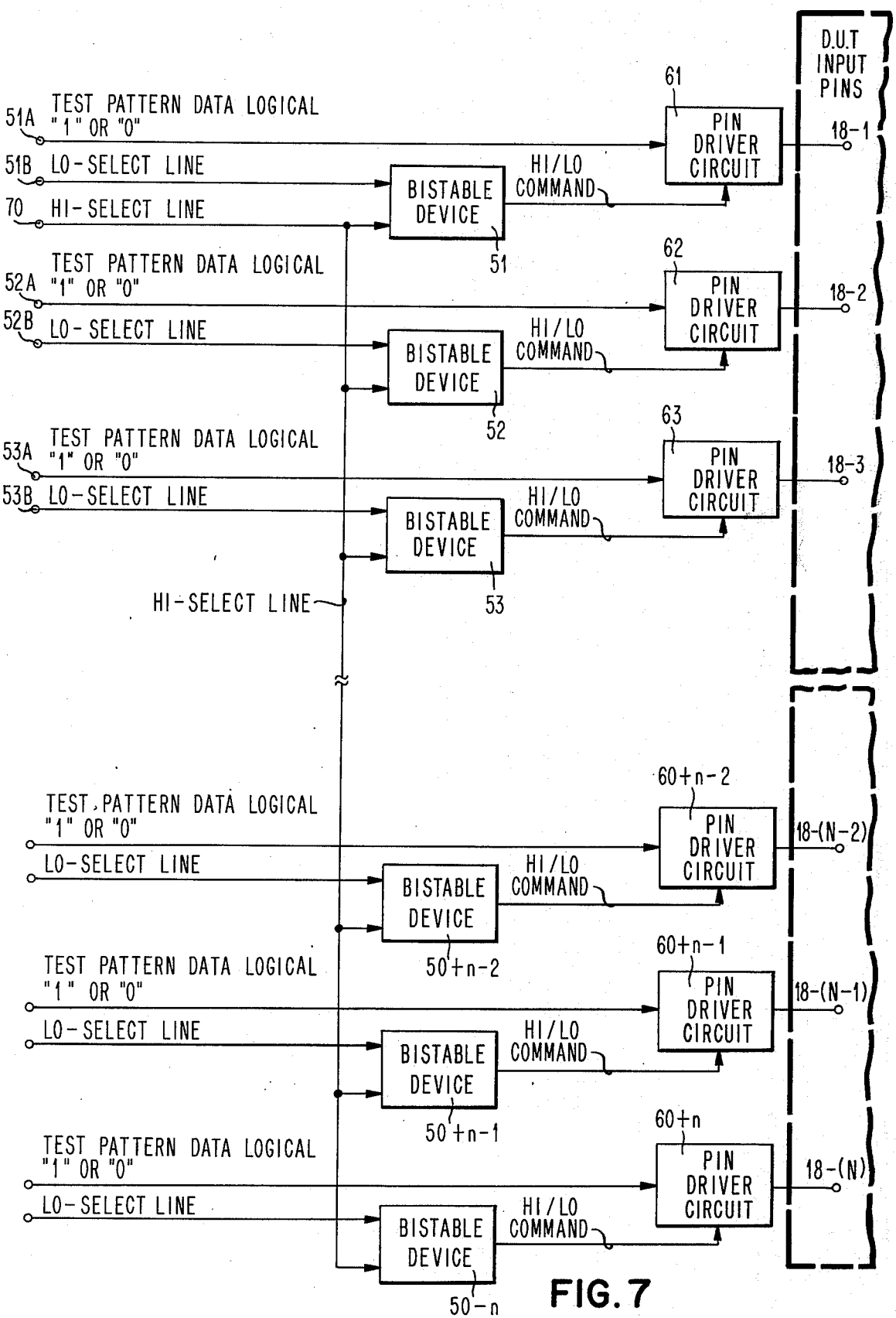

FIG. 7 discloses novel Pin Driver Circuit structure that may be employed to practice a second alternative embodiment of the invention.

It is well known in the art to employ a suitable computer system to exercise primary control over an electronic device test system. The computer controls the test sequence and parameters under the control of test programs. The preparation of test programs is well known to the art. The test patterns are, as is well known in the art, provided by the computer system and associated apparatus under control of the test program. The test programs are functionally related to the device being tested. Stated differently, a skilled programmer writes test programs that include appropriate test patterns and procedures for testing the device under test.

In accordance with the present invention, a system controller or computer system includes a memory and is the source of test patterns, expected results, and system synchronizing signals. The computer system also directs the mode of operation of the tester. The system memory also receives and stores pass/fail data including Hi/Lo command data relative to the device under test. The test patterns, as utilized, provide the basic electrical manifestations of the logical ones and zeros to be applied to the input terminals of the device under test (D.U.T.). There is a chnanel for each input terminal of the D.U.T. These channels transmit test pattern data from the system controller to the D.U.T. Each channel contains Decode logic structure. There is an independent random pulse source associated with each channel. There is an analog drive associated with each channel. The decode logic structure in each channel accepts test pattern information and gated random pulse data from its Random Pulse Source and provides one of four commands via its associated analog drive. For each step of a test pattern the command emanating from the Decode logic structure is one and only one of the following: MPUL, LPUL, LNDL, or MNDL. In summary, if the D.U.T. has n input terminals, n independent channels are required. Each channel has Decode Logic structure, a Random pulse source, and an Analog drive comprising four drive lines. A system Synchronizing structure accepts system synchronizing signals from the System controller and provides timing and control signals designated as Random Pulse Enable Signal, Drive Command Signal and Sample Data Command Signal. The Random Pulse Enable Signal gates through random pulses to the Decode Logic structure. The Drive Command Signal is utilized by the Decode Logic structure to acutate the analog drive in response to test pattern data and noise from the Random Pulse Source. Input Driver Structure is connected between the analog drive and an input terminal of the device under test (D.U.T.). There is an Input driver structure for each channel and they respectively perform an interfacing function. Comparator structure accepts an Output Data Signal from the D.U.T., an Expected Results Data Signal from the System controller, a Sample Data Command Signal from the System Synchronizing structure, and provides to the System controller a PASS/Fail Data Signal. Thre is contained in the comparator structure a comparator circuit for each output terminal of the D.U.T. There is likewise an Expected Results Data signal and a Pass/Fail Data Signal for each output terminal of the D.U.T.

DETAILED DESCRIPTION OF THE PREFERRED EMBODIMENT

Referring to FIG. 1, there is shown an embodiment of the electronic device test system constructed in accordance with the principles and teachings of applicant's invention. System Controller 1 exercises primary control over the system, namely, the timing, test sequence and parameters according to an operational test program. The operational test program is provided by a programmer. Test programs are readily available in the art, and per se are not a part of applicant's invention. The preparation of test programs for practicing applicant's invention is well within the skill of persons skilled in the art.

The System Controller 1 of FIG. 1 provides test patterns to Decode Logic 3. Each test pattern comprises a number of steps. Each step comprises a plurality of electrical manifestations of logical ones and logical zeros. Each test pattern step will contain an electrical manifestation of either a logical one or a logical zero for each input terminal of the device under test (D.U.T.).

Assume for purposes of discussion that the device to be tested is a multiple input logic network having n inputs, where n is an integer in the range of 10 through 3,000. Then it is convenient to consider the structure interconnecting the System Controller to the D.U.T. as consisting of n channels. Each channel conveying, subject to modification an electrical manifestation of either a logical one or a logical zero to an input terminal of the D.U.T. Since each of said n channels is identical in structure an operation, only one of said n channels will be described in detail. Each channel includes Decode Logic 3, Analog Drive 8 and Input Driver 9. Decode Logic 3 is shown in detail in FIG. 3A. The four lines of Analog Drive 8 are shown in detail in FIGS. 3A and 3B.

As shown in FIG. 1, System Timing 6 accepts a System Synch Signal from System Controller 1 and provides the following appropriately timed output signals, namely, Random Pulse Enable Signal, Drive Command Signal, Sample Data Command Signal. System Timing 6 may be considered a source of system timing gates and pulses all derived from the System Synch Signal. See FIG. 4 for system timing.

Each of said n channels has a Random Pulse Source 4 associated with it. The Random Pulse Source 4 may be a freerunning multivibrator designed to run erratically with repsect to a center frequency by employing, for example, unregulated power sources in conjunction with noise and temperature sensitive components. Any one of a number of suitable Random Pulse Sources, known to the art, may be employed.

The output of Random Pulse Source 4 is gated via AND circuit 5 by the Random Pulse Enable Signal to Decode Logic 3. The ouput of AND Circuit 5 is a series of bursts of random pulses, one burst of Random Pulses per test step. There is an indeterminate number of pulses in each burst.

Decode Logic 3 accepts, test pattern data, gated random pulses, and the Drive Command Signal, and provides one and only one of four commands on Analog Drive 8. The four possible commands are "Hi-One Select," "Lo-One Select," "Hi-Zero Select" and "Lo-Zero Select," or MPUL, LPUL, LNDL, MNDL, respectively.

The Drive Command Signal causes the Analog Drive 8 to render one and only one of the above identified output commands. The particular output command rendered by Analog Drive 8, in response to the Drive Command Signal, is dictated by the test pattern data input and the number of gated random pulses conveyed to Decode Logic 3.

The Random Pulse Enable Signal gates through random pulses to Decode Logic 3 during the quiescent period of Analog Drive 8.

Analog Drive 8 of each channel comprises four lines interconnecting the output of Decode Logic 3 to the input of Input Driver 9. Analog Drive 8 conveys one of the four afore-recited commands to Input Driver 9.

Input Driver 9 of each channel has its output directly connected to an input terminal 18 of D.U.T. 17. There are $n$ input drivers each performing an interfacing function.

The D.U.T. 17 has its Power terminals 20 connected to a suitable power supply 16. The output terminals 19 of D.U.T. 17 are connected to Comparator 12.

The Expected Results Data Signal is furnished by the System Controller, during each test pattern step, and predicts the correct status of the output terminals 19 of the D.U.T. 17 for the current test pattern step. Stated differently the Expected Results Data Signal is an electrical manifestation of the correct output of D.U.T. 17 for a given logical input of ones and zeros. If the D.U.T. has m outputs there will be m logical ones or zeros contained within the Expected Results Data Signal.

Comparator 12 accepts the outputs from terminals 19 of the D.U.T., the Expected Results Data Signal from System Controller 1 and the Sample Data command Signal from System Timing 6, and provides the Pass/Fail Data Signal to System Controller 1. In short, for each Test Pattern Step the Comparator 12 compares the output of the device under test with a known good standard and provides an output indicative of the results of said comparison. Where the device under test has m output terminals comparator 12 may comprise m bit comparators. Thus, for every bit position of the output of the device under test a comparison is made with the corresponding bit position of the Expected Results Data Signal. The Pass/Fail Data Signal then contains m indications. Each indication of the Pass/Fail Data Signal states that the output of a given terminal 19 of D.U.T. 17 compares favorably or unfavorably with the Expected Result for that particular terminal for the then current Test Pattern Step.

In mutliple input logic networks the output of a device having $m$ output terminals is a data word expressed in logical ones and/or zeros. It will be appreciated that these output data words from the device under test may be conveyed to the System Controller for storage and processing, where the System Controller comprises a computing system of sufficient size and capacity.

Referring to FIGS. 1 and 3A it is seen that lead 50 conveys the status of the Hi-Lo Command of bistable device 25 of each channel to the System Controller. The controller samples the status of the Hi-Lo Command device during every test step. Thus, it is apparent the System Controller has available for analyze for the device under test, and every input and output terminal thereof complete test data. Namely, this data includes the applied input, the resulting output, Pass/Fail data, and specifically data as to whether the one or zero applied was "high" or "low."

The Sample Data Command Signal is a timing strobe utilized during each Test Pattern step to intiate the comparison by Comparator 12 of the output of the D.U.T. with the Expected Results Data contained within the Expected Results Data Signal.

Power Supplies 16 provide appropriate potential, including ground to power terminals 20 of the device under test 17. The number of independent or separate power supplies is dictated by the device under the test. If there are $p$ separate power requirements of the device under test then $p$ power supplies are provided, each power supply having its own interconnection means for supplying power to the device under test. The term power supply as used herein includes and is not limited to, regulated and unregulated sources of electrical potential, constant current sources and grounding connections.

Still referring to FIG. 1 the operation of applicant's inventive tester will be explained with reference to a not untypical test pattern step. The System Controller 1 provides to each of said n channels, respectively, an electrical manifestation of either a logical one or a logical zero. Assume that, channel $n$ -3 has impressed on it an electrical manifestation representative of a logical one, channel $n$-2 has impressed on it an electrical manifestation representative of logical zero, channel $n$-1 has impressed on it an electrical manifestation representative of logical one, and channel n has impressed on it an electrical manifestation representative of a logical zero.

The Decode Logic 3 of channel $n$-3 will accept the electrical manifestation of logical one and render via analog drive 8 an electrical manifestation, or command, of a logical one at either the MOST POSITIVE UP LEVEL (MPUL) or at the LEAST POSITIVE UP LEVEL (LPUL). Which of the two states, MPUL or LPUL, is delivered by Decode Logic 3 of channel $n$-3, is determined by a bi-stable device contained within the Decode Logic thereof. Under the preferred embodiment of this invention the bi-stable device of Decode Logic 3 may be in either of its two states during any Test Pattern Step. Between steps of the Test Pattern the state of the bi-stable device of channel $n$-3 will change states a random number of times, in reponse to Gated Random Pulses from the Random Pulse Source 4 associated with channel $n$-3. Assume for purposes of discussion that the bi-stable device or a flip-flop of channel $n$-3 subsequent to the receipt of Gated Random Pulses, is in its first state. Then the Analog Drivers of channel $n$-3 will provide to the Input driver 9 of channel $n$-3, the command, in the form of an electrical manifestation, MPUL (Hi-One Select). As will be appreciated from the earlier discussion herein, the Input Driver 9 of channel n-3, will in response to this input impress upon the terminal n-3 of input terminals 18 of the D.U.T. an electrical manifestation representative of a logical one at its MOST POSITIVE UP LEVEL.

It is further assumed, merely for purposes of discussion that respectively subsequent to receipt of Gated Random Pulses the bistable device, or flip flops, of channels n-2, n-1 and n are in the following states, second, second, and first, respectively. Then terminals n-2, n-1 and n of Input Terminals 18 of the D.U.T. will respectively have impressed thereon electrical manifestations of a logical zero at its MOST NEGATIVE DOWN LEVEL, a logical one at its LEAST POSITIVE UP LEVEL, and a logical zero at its LEAST NEGATIVE DOWN LEVEL.

It is now apparent that the Test Pattern data for each step of the test pattern dictates the logical value (one or zero) impressed on the respective input terminals 18 of the device under test. It will also be apparent that for each step of the Test Pattern the high or low electrical manifestation of the logic value (one or zero) impressed on the respective input terminals 18 of the D.U.T. is determined independently for each terminal by the state of the bi-stable device, or flip-flop, of the channel associated with the particular input terminal. Also, the state of each of the n flip-flops, one associated with each of said n channels, is each randomly arrived at in response to Gated Random Pulses respectively from n independent Random Pulse Sources. Each of Random Pulse Sources being exclusively associated with one of said n flip-flops and its channel.

It is now apparent that for each Test Pattern step the logical ones and zeros, as impressed on the device under test are respectively randomly modified.

During the later portion of each test step the output from the device under test is compared to a known good standard and an indication is given as to the merit or lack of the device under test. The result of this comparison is provided for utilization and/or storage to the System Controller.

The storage of comparator results in addition to other test result data is conveyed to the System Controller. It is known in the art that certain storage elements in a test system should be sampled at appropriate test times, and especially subsequent to a "fail" indication. In applicant's inventive tester at least the status of bi-stable device 25, FIG. 3A (Hi-Lo Command) is, or may, be sampled for each and every input terminal, particularly in the event of a Fail indication on any one or more output terminals. (See also leads 50, FIGS. 1 and 3A). This information, in conjunction with the test pattern information (already in storage) and in conjunction with the test step data in response to which the Fail indication occurred, will when properly analyzed by a computer, and/or human review, yield valuable diagnostic data relative to the cause, or causes of failure of the D.U.T.

The Decode Logic 3, as shown in FIG. 3A and employed within each of the afore-recited n channels, will now be described in detail. During each step of the test pattern terminal 21 has the electrical manifestation of either a logical one or a logical zero impressed thereon. Terminal 21 is connected to input D of flip-flop 26. The Drive Command Signal is impressed on terminal 22 and through associated leads on input C of Flip-Flop 26 and input C of Flip-Flop 27. Terminal 23 is connected to a positive potential source having a magnitude in the order of logical one. The positive potential on Terminal 23 is impressed on input terminals J and K of Flip-Flop 25. Output terminal Q of Flip-Flop 25 is connected to input terminal D of Flip-flop 27. And Circuit 28 has, a first input connected to the Q output terminal of Flip-Flop 26, a second input connected to the Q output terminal of Flip-Flop 27, and an output labelled "Hi-One Select." And Circuit 29 has, a first input connected to the Q output terminal of Flip-Flop 26, a second input connected to the Q output of Flip-Flop 27, and an output labelled "Lo-One Select." And Circuit 30 has, a first input connected to the Q output terminal of Flip-Flop 26, a second input connected to the Q output terminal of Flip-Flop 27, and an output labelled Hi-Zero Select. And Circuit 31 has, a first input connected to the Q output terminal of Flip-Flop 26, and a second input connected to the Q output terminal of Flip-Flop 27 and an output labelled Lo-Zero Select.

Flip-Flop 25 may be of a type known in the art as a TTL J-K Type Edge Triggered Flip-Flop with terminals J and K thereof both tied to logical one. Flip-Flop 25 then changes state for each negative transition at terminal C. Gated random pulses cause Flip-Flop 25 to arrive at either one of two states. Output Q of Flip-Flop 25 is therefore randomly at either a one up potential or zero down potential during each Test Pattern Step. This is designated in FIG. 3A by the legend Hi-Lo Command on the interconnection between the Q output terminal of Flip-Flop 25 and the D input terminal of Flip-Flop 27.

Flip-Flops 26 and 27 may be of a type known in the art as TTL D-Type Edge Triggered Flip-Flops. Flip-Flops 26 and 27 are a pair of "data" flip-flops. Data in the form of a one or a zero at the D input thereof will appear at the Q output when the C input sees a positive going edge. The Test Pattern Data impressed on terminal 21 is a predetermined one or zero. The Hi-Lo Command signal from Flip-Flop 25 is a random one or zero. In response to the Drive Command Signal Flip-Flops 26 and 27 are driven to and assume one of the following four possible states: 00; 01; 10 or 11.

And Circuits 28, 29, 30 and 31 are respectively two way And gates that operate on positive logic, i.e., output is plus when both inputs are plus. These And Circuits serve as a decode network whereby one and only one of the four lines of Analog Drive 8 is positive at a time, namely during a Test Pattern Step. The output of Analog Drive 8 electrically manifests each discrete state of Flip-Flops 26 and 27.

Where a 1 is representative of a postive potential and a 0 is representative of a negative potential, the following truth table is explanatory of the Decode Logic Function performed by Flip-Flops 26 and 27 and And Circuits 28, 29, 30 and 31 of FIG. 3A.

| Flip-Flop 26 | | Flip-Flop 27 | | And 28 | And 29 | And 30 | And 31 |
|---|---|---|---|---|---|---|---|
| Output Terminal Q | Output Terminal Q̄ | Output Terminal Q | Output Terminal Q̄ | Hi-One Select Line | Lo-One Select Line | Hi-Zero Select Line | Lo-Zero Select Line |
| 1 | 0 | 1 | 0 | 1 | 0 | 0 | 0 |
| 1 | 0 | 0 | 1 | 0 | 1 | 0 | 0 |

| Flip-Flop 26 | | Flip-Flop 27 | | And 28 | And 29 | And 30 | And 31 |
|---|---|---|---|---|---|---|---|
| Output Terminal Q | Output Terminal Q̄ | Output Terminal Q | Output Terminal Q̄ | Hi-One Select Line | Lo-One Select Line | Hi-Zero Select Line | Lo-Zero Select Line |
| 0 | 1 | 1 | 0 | 0 | 0 | 1 | 0 |
| 0 | 1 | 0 | 1 | 0 | 0 | 0 | 1 |

The input Driver 9, as shown in FIG. 3B and employed within each of the afore-recited n channels, will now be described in detail.

Input Driver 9 includes an Analog Switch 34. The Analog Switch 34 has four possible inputs from Decode Logic 3. The four possible inputs to Analog Switch 34 are Hi-One Select, Lo-One Select, Hi-Zero Select and Lo-Zero Select. These four drive lines of Analog Drive 8 are respectively connected via Internal drives 35B, 36B, 37B and 38B to Field Effect Transistor Switches 35, 36, 37 and 38. The outputs of F.E.T. Switches 35, 36, 37 and 38 are connected in common to the summing input of Operational Amplifier 39. F.E.T. Switches 35, 36, 37 and 38 are each coupled through a suitable resistor (R2A, R2B, R2C and R2D) to an appropriate potential source. Switch 35 is connected through a 10 K ohm resistor to a Hi-One reference voltage source. Switch 36 is connected through a 10 k ohm resistor to Lo-One reference voltage source. Switch 37 is connected through a 10 k ohm resistor to a Hi-Zero reference voltage source. Switch 38 is connected through a 10 k ohm resistor to a Lo-Zero reference voltage source.

The four drive lines of analog drive 8 each have an internal driver 35B, 36B, 37B and 38B and an F.E.T. Switch 35, 36, 37 and 38. The internal drives respectively convert the TTL logic signal, namely, Hi-One Select, Lo-One Select, Hi-Zero Select and Lo-Zero Select, to a suitable drive for turning on the associated F.E.T. Switch. As stated earlier herein, only one of the four lines of Analog Drive 8 is conditioned at any time. The corresponding F.E.T. Switch 35, 36, 37 or 38 is turned on and the appropriate reference voltage 35A, 36A, 37A or 38A is applied to the input of Operational Amplifier 39. The ouput 18A of Operational Amplifier will equal the input, in other words the chosen reference voltage and will be impressed on an input terminal 18 of the device under test 17.

The D.C. reference voltage 35A, 36A, 37A and 38A are respectively chosen as the desired four logic values, MPUL, LPUL, LNDL and MNDL and applied as called for by Analog Drive 8 to the input of Operational Amplifier 39.

Analog Switch 34 may be a Quad SPST FET Analog Switch, Type No. AH0015CD commercially obtainable from the National Semi-Conductor Co.

Operational Amplifier 39 may be any commercially available Operational Amplifier which, when connected in the configuration shown, performs the dual function of isolating the input terminal 18 of the device under test and provides suitable driving power without phase inversion. An Operational Amplifier Type No. LH0024 available from National Semi-Conductor Co. may be employed.

In FIG. 3B the values of R1, R2A, R2B, R2C, R2D, R3 and R4 are each shown as 10 k ohms. This is an illustrative suitable value, correct for the operation of applicant's tester as shown and described. As will be apparent to those skilled in the art, the aforeidentified resistors may have a resistance value other than 10 k ohms. However, for optimum operation of applicant's test system the aforeidentified resistors should be equal, or approach equality, in resistance, one to another. Now with the afore-identified resistors of FIG. 3B each having a resistance value equal to each other resistor, and one and only of the F.E.T. Switches (35, 36, 37 or 38) being conductive, the voltage appearing at terminal 18A will be equal to the full reference voltage associated with the particular conductive F.E.T. Switch. Namely, the voltage at terminal 18A will be one of the following Hi-One Reference Voltage, Low-One Reference Voltage, Hi-Zero Reference Voltage, or Lo-Zero Reference Voltage.

For Example:

Assume the Hi-One Reference Voltage on terminal 35A is +5.2 volts. Then when F.E.T. Switch 35 is conductive (or closed) a potential of +5.2 volts will be impressed on terminal 18A.

Assume Lo-One Reference Voltage on terminal 36A is +4.8 volts. Then when F.E.T. Switch 36 is conductive (or closed) a potential of +4.8 volts will be impressed on terminal 18A.

Assume Hi-Zero Reference Voltage of terminal 37A is −4.8 volts. Then when F.E.T. Switch 37 is conductive (or closed), a potential of −4.8 volts will be impressed on terminal 18A.

Assume Lo-Zero Reference Voltage on terminal 38A is −5.2 volts. Then when Switch 38 is conductive (or closed) a potential of −5.2 volts will be impressed on terminal 18A.

Stated in a different manner, assume the reference voltages impressed on terminals 35A, 36A, 37A, and 38A are respectively designated as Upper one, Lower one, Upper zero, and Lower zero. The following table tabulates the operation of the input driver circuit of FIG. 3B.

| Activated Line or Command, of Analog Drive 8 | F.E.T. Switch Closed | Potential On Terminal 18A |
|---|---|---|
| Hi-One Select | 35 | "UPPER ONE" |
| Lo-One-Select | 36 | "LOWER ONE" |
| Hi-Zero Select | 37 | "UPPER ZERO" |
| Lo-Zero Select | 38 | "LOWER ZERO" |

It is to be appreciated that applicant's invention, as stated earlier herein, is not to be considered limited to any particular magnitudes of reference voltages applied to terminals 35A, 36A, 37A and 38A, nor to any particular potentials, high or low, representing logical ones and zeros. Nor is applicant's invention to be considered limited to electrical manifestations in the form of potential levels.

Further applicant's invention is not to be considered limited to the particular structure set forth in applicant's preferred or alternative embodiments.

Referring to FIG. 4, the timing of a typical Test Pattern Step is represented. The Test Pattern Step has a time duration of $t_0$ to $t_1$. In the illustrative example shown the test pattern impresses a logical one on a particular channel. Thus, for the time period $t_0$ to $t_1$ a one is impressed on the Decode Logic of this channel. During the initial portion of the time period of the test step the Random Pulse Enable Signal gates through a plurality of Gated Random Pulses.

Subsequent thereto the Drive Command Signal causes one of the four lines of Analog Drive 8 to be actuated. For the example under consideration namely where the Test Pattern Data is a logical one the Hi-One Select or the Lo-One Select line of Analog Drive 8 will be actuated. During a latter time portion of the test step the Sample Data Command Signal causes a comparison to be made between the output of the Device under test and Expected Results Signal.

It will now be apparent that applicant's novel tester and test method will apply to the device under test randomly a MPUL or LPUL electrical manifestation for each logical called by the test pattern and a LNDL or MNDL electrical manifestation for each logical zero called for by the test pattern.

Thus, it is apparent that worst case stressing of the device under test becomes very highly probable, with an ever increasing probability as the number of test steps increases.

ALTERNATIVE EMBODIMENT

Referring to FIGS. 5 and 6 an alternative embodiment of applicant's invention will be described. In the preferred embodiment of applicant's invention one and only of the four Analog Drive lines per channel are actuated per Test Pattern Step, and remain so actuated during the entire Test Pattern Step. Referring to the timing diagram FIG. 4 of the preferred embodiment, and to Decode Logic Fig. 3, it will be noted that two conditions cooperate to cause this to occur: (1) noise pulses (Random pulses) are gated and cease to be applied to bistable device just prior to the Drive Command signal; (2) Flip-Flop 27 latches Hi-Lo Command from bi-stable device 25 for an entire cycle, commencing with the Drive Command Signal and sustaining until the start of the next Drive Command Signal. As fully explained earlier herein this permits, in the preferred embodiment, a steady state condition of one of four possible drive conditions to each input pin of the D.U.T, namely, MPUL, LPUL, LNDL, or MNDL for each Test Pattern Step.

Now, in the alternative embodiment, reference is made to FIG. 5A and timing diagram FIG. 6, two modifications from the preferred embodiment will be noted: (1) Random pulses are ungated and are therefore continuously applied to binary J-K flip-flop 25A; Binary flip-flop 25A continuously changes state as noise pulses are received and; (2) the outputs (Q and $\overline{Q}$) of binary flip-flop 25A are applied directly to the AND gate decode network consisting of And Circuits 28, 29, 30 and 31.

Outputs Q and $\overline{Q}$ of flip-flop 25A each continuously fluctuate.

It is now apparent from the circuit of FIG. 3A that when the Test Pattern Step calls for a one (terminal 21) the one electrical manifestation impressed on the input terminal of the device under test will fluctuate between MPUL and LPUL during the Test Pattern Step. Likewise, if a zero is called for by the Test Pattern Step the zero electrical manifestation impressed on the input terminal of the device under test will fluctuate between LNDL and MNDL during the Test Pattern Step. The above will be evident from inspection of FIG. 6 wherein the conditions illustrating a Test Pattern Step of time duration $t_0$ through $t_1$ are depicted for logical one.

Furthermore, taking all input drivers together, it is evident that, although the logical ones and zeros are synchronously called for by the Test Pattern Step the fluctuations of each said ones and zeros are random. This random operation is readily apparent when it is recalled that each bistable device 25A is driven by an independent random source of pulses.

This fluctuation during test pattern steps has the advantage of subjecting the device under test to noisy ones and zeros within the limits of MPUL and LPUL; and LNDL and MNDL, respectively. This is an additional and unique stressing method, finding particular merit in the testing of certain devices.

SECOND ALTERNATIVE EMBODIMENT

Referring to FIG. 7 an alternative embodiment of applicant's invention will be described. Pin Driver circuits 61 through 60+$n$ respectively impress on input terminals 18-1 through 18-N of the device under test one of the following four electrical manifestations MPUL, LPUL, MNDL, or LNDL. In this embodiment, the Test Pattern designates during each test step that a logical one or logical zero be impressed on each input terminal of the device under test. The state of the Bistable Device 51 through 50+$n$ determines whether a Hi or Lo value of logical one or zero as called for by the test pattern will be impressed on the input terminal.

Each Pin Driver Circuit 61 through 60+$n$ has two inputs, the first is test pattern data calling for a logical one or a logical zero and the second input is a Hi/Lo Command from a Bistable Device. Each Bistable Device has a Lo-Select line input and a Hi-Select line input. As seen in FIG. 6 the Hi-Select line of each Bistable Device, 51 through 50+$n$, is connected in common to terminal 70. A Hi-Select signal on Line 70 causes each of said Bi-Stable Devices to assume a first steady-state condition. A signal on any one or more of the Lo-Select lines of the Bistable Devices results in the Bistable Devices which receive a Lo-Select line signal assuming a second Steady-State Condition.

Assume for purposes of explanation that at the beginning of a Test Pattern Step all Bistable Devices, 51 through 50+$n$, are subjected to a Hi-Select Signal on this Hi-Select line causing all said Bistable Devices to assume said first steady-state condition. Assume further that during the Test Pattern Step no Lo-Select signals are impressed on any of the Bistable Devices. Then during this test pattern step those input terminals of the device under test will have a MOST POSITIVE UP LEVEL impressed upon them where the Test Pattern Data calls for a logical one and those input terminals of the device under test will have a Least Negative Down Level impressed upon them where the test pattern data calls for a logical zero.

It will now be apparent that in the embodiment of FIG. 6, any individual Bistable Devices receiving a Lo-Select signal subsequent to receipt of a Hi-Select signal will issue a Lo-Command to their Pin Driver circuitry. A Lo-Command will result in a LEAST POSITIVE UP LEVEL being impressed on the input terminal of the device under test when the Test Pattern calls for a logical one and a MOST Negative Down Level being impressed on the input terminal of the device under test when the Test Pattern calls for a logical zero.

It will now be apparent that the embodiment of FIG. 6 permits during each test pattern step the selection of a Hi or Lo value for each input terminal of the device under test.

It will be further apparent in view of the earlier explanation of the preferred embodiment and first alternative embodiment that a monostable or astable means may be employed in lieu of or in addition to any one or more of the Bistable devices 51 through 50+n. It will be appreciated that where a monostable or astable means is employed and actuated the electrical manifestation of a logical one or zero, as called for by the test pattern, will vary in magnitude during the test pattern step.

A further embodiment of applicant's invention may utilize certain channels of the general type described and illustrated as the preferred embodiment of applicant's invention and the remaining channels may be generally in accordance with the channels described and/or illustrated as alternative embodiments of applicant's invention.

While this invention has been particularly described with reference to the preferred embodiments thereof, it will be understood by those skilled in the art that the foregoing and other changes in form and details may be made therein without departing from the spirit and scope of the invention.

What is claimed is:

1. An electronic test system for testing high density logic networks having n input terminals and m output terminals, where n and m are integer numbers respectively greater than ten, said system employing test patterns under control of a system test program, where each test pattern includes a plurality of test steps and each test step includes n discrete electrical manifestations of logical ones and/or logical zeros, said test system comprising: a system controller operative under control of said test program for providing test pattern data, including said n discrete electrical manifestations, during each of said test steps, said system controller including storage means for storing Test Patterns, Expected Test Result Data and Pass/Fail Test Data; first circuit means responsive to said system controller for accepting, during each test step, said n discrete electrical manifestations of logical ones and/or logical zeros, second circuit means responsive to said first circuit means for randomly rendering either a first or a second discrete electrical manifestation representative of each of said logical ones and/or either a first or a second discrete electrical manifestation representative of each of said logical zeros; third circuit means coupled to said second circuit means and said n input terminals of the high density logic network under test for impressing on each of said n input terminals either said first or second discrete electrical manifestation of a logical one where said test pattern step designates a logical one be applied to said terminal, or said first or second discrete electrical manifestation of a logical zero where said test pattern step designates a logical zero be applied to said terminal; fourth means coupled to said m output terminals of said high density logic network under test and to said system controller, for accepting and comparing during each test step the output of said high density logic network and the Expected Results Data from said System Controller, said fourth means rendering to said system controller Pass/Fail Test Data relative to the high density logic network under test.

2. An electronic test system for testing large scale integration devices having n input pins and m output pins, where n and m are respectively integer numbers greater than 10 and less than 3,000, and n and m bear no fixed mathematical relationship one to the other, said system employing test patterns under control of a system test program, each test pattern including a plurality of test steps, each test step including at least n discrete electrical manifestations of logical ones and logical zeros, said n discrete electrical manifestations of logical ones and logical zeros of each said test step representing a portion of the truth table for the large Scale Integration device under test, said electronic test system comprising: a system controller for controlling said electronic test system, said system controller including storage means for storing data including at least one test program having at least one test pattern including a plurality of test steps, said system controller being operative under and in response to said test program to sequentially present each successive step of said test pattern; said system controller being further operative and responsive to said test program to provide, in timed relationship with each step of said test pattern, a system Synch signal, and an Expected Results data signal, said system controller being further operative and responsive to said test program to accept and store, in timed relationship with each step of said test pattern, a Pass/Fail Data signal; n electronic channel means, each said channel means adapted to receive one of said n discrete electrical manifestations, each said channel means coupled to a discrete one of said n input terminals of said large scale integration device under test; System timing means adapted to receive said System synch signals and provide respectively in timed relationship to each said system synch signal a Random Pulse Enable Signal, a Drive Command Signal, and a Sample Data Command Signal; each of said channel means including Decode Logic means for accepting said one of said n discrete electrical manifestations, each of said channel means including a free running random pulse generator having an output, and an And circuit having first and second inputs and an output, said first input of said And circuit connected to said System Timing means for receiving said Random Pulse Enable Signal, said second input of said And circuit connected to said output of said Random Pulse generator and said output of said And circuit connected to said Decode Logic means, said Decode Logic means of each of said n channels including a first bistable device, a second bistable device, a third bistable device and And circuit means, said first bistable device having an output and being adapted to receive, via said And circuit, and under control of said Random Pulse Enable Signal, a random number of pulses, said first bistable device assuming in response to said pulses a first steady-state condition or a second steady-state condition, said first steady-state condition of said first bistable device being manifested at said output of said first bistable device by a first electrical potential and said second steady-state condition of said first bistable device being manifested at said output of said bistable device by a second electrical potential, said first electrical potential being greater in magnitude than said second electrical potential, said second bistable device having a first input adapted to receive one of said n discrete electrical manifestations, said second bistable device having a second input adapted to receive said Drive Command Signal, said second bistable device having first and second outputs respectively coupled to said And circuit means, said third bistable device having a first input adapted to receive the output of said first bistable device, said third bistable device having a second input adapted to receive said Drive Command Signal, said third bistable device having first and second outputs respectively coupled to said And circuit means; said And circuit means having four discrete output lines only one of which is activated during each of said test pattern steps in response to said first and second outputs from said second and third bistable devices, said four discrete output lines respectively issuing electrically the following commands, Hi-One Select, Lo-One Select, Hi-Zero Select, and Lo-Zero Select, each in response to a particular steady-state condition of said second and third bistable devices; discrete input driver means included within each of said n electronic channel means, each said driver means connected to said four dicrete output lines of said And circuit means, each said input driver means having an output for electrically manifesting either a logical one at either a MOST Positive UP Level or a Least Positive UP Level, or a logical zero at either a Least Negative Down Level or a MOST Negative Down Level during each test pattern step, and respectively, in response to one of said electrically manifested commands from said Decode logic means; means coupling the output of each of said n driver means to a discrete one of said n input terminals of a Large Scale Integration Device under test; comparator means connected to said m output terminals of said Large Scale Integration Device, and adapted to receive during each test pattern step said Expected Results Data Signal and said Sample Data Command signal, said comparator means rendering a Pass/Fail Data signal based on a comparison of output data from said device under test and said Expected Results Data Signal, whereby each said Large Scale Integration device under test has impressed on each of said n input terminals, during each test pattern step, an electrical manifestation of a logical one or zero as directed by said test pattern step, where said electrical manifestations of said logical ones are randomly at either said Most Positive UP Level or said Least Positive UP Level, and said electrical manifestations of said logical zeros are randomly at either said Least Negative Down Level or said Most Negative Down Level, and a determination is made as to the merit of the device under test based on the output therefrom.

3. An electronic test system, as recited in claim 2, wherein said input driver means includes first, second, third and fourth field effect transistor switch means.

4. An electronic test system as recited in claim 3, wherein said means coupling the output of each of said $n$ driver means to a discrete one of said $n$ input terminals, comprises Operational Amplifier means.

5. An electronic test system as recited in claim 4 wherein said comparator means compares the output at each of said m output terminals with the corresponding portion of said Expected Results Data Signal and said Pass/Fail Data Signal electrically manifests the merit or lack of merit of the output electrically manifested at each of said m output terminals.

6. An electronic test system for testing a Large Scale Integration logic device having n input terminals and m output terminals, where $n$ and $m$ are respectively integer numbers greater than 10 and not exceeding 3,000, said system employing at least one test pattern under control of a system test program, each test pattern including a plurality of test steps, each test step of each test pattern including at least n discrete electrical manifestations, $x$ of said discrete electrical manifestations representing logical ones, $n\text{-}x$ of said discrete electrical manifestations representing logical zeros, where $x$ is any integer number from zero through $n$, said test system comprising:

a system controller, said system controller including storage means for storing said test program, said test patterns, Expected Results Data and Pass/Fail Data, said system controller being operative under control of said test program for providing said $x$ discrete electrical manifestations representing logical ones and said $n\text{-}x$ discrete electrical manifestations representing logical zeros during each test step of a test pattern, first circuit means connected to said system controller for accepting said $x$ electrical manifestations of a logical one and said n-x electrical manifestations of a logical zero and providing $y$ electrical manifestations of a logical one at a first electrical magnitude, $x\text{-}y$ electrical manifestations of a logical one at a second electrical magnitude, $z$ electrical manifestations of a logical zero at a third electrical magnitude, and $n\text{-}x\text{-}z$ electrical manifestationss of logical zero at a fourth electrical magnitude, where $y$ is any integer in the range of zero through $x$, $z$ is any integer in the range of zero through $n\text{-}x$ and said first, second, third and fourth electrical magnitudes are respectively unequal in magnitude; second means responsive to said first means for impressing each of said electrical manifestations provided by said first means on a discrete predetermined one of said n input terminals of said device under test; comparator means coupled to said m output terminals of said device under test and to said system controller, for accepting and comparing during each said test step the output of said device under test and the Expected Result Data from said System Controller and rendering to said System Controller Pass/Fail Test Data relative to the device under test.

7. An electronic test system for testing a high circuit density logic device, said logic device having n input terminals and m output terminals, where $n$ and $m$ are respective integers having a magnitude greater than ten and less than three thousand, said system employing at least one test pattern under control of a system test program, each said test pattern including a plurality of test steps, each said test step including $n$ discrete electrical manifestations, $t$ of said discrete electrical manifestations representing logical ones, $n\text{-}t$ of said discrete electrical manifestations representing logical zeros, where $t$ is any integer number ranging in value from zero through $n$, said test system comprising: a system controller, said system controller including storage means for storing said test program, said test pattern, Expected Results Data and Pass/Fail Data, said system controller operative under control of said test program for providing said $t$ discrete electrical manifestations representing logical ones and said $n\text{-}t$ discrete electrical manifestations representing logical zeros during each test step of a test pattern; first circuit means connected to said system controller for accepting said $t$ discrete electrical manifestations of a logical one and randomly modifying the electrical manifestation of $v$ of said $t$ discrete electrical manifestations, where $v$ is any integer in the range of zero through $t$; said second circuit means connected to said system controller for accepting said *n-t* discrete electrical manifestations of a logical zero and randomly modifying the electrical manifestation of s of said *n-t* discrete electrical manifestations, where *s* is any integer in the range of zero through *n-t*; third circuit means coupled to said first and second circuit means and connected to said *n* input terminals for impressing said n electrical manifestations received from said first and second circuit means on said n input terminals where each of said *n* input terminals has an electrical manifestation of either a logical one or logical zero impressed thereon as dictated by the one and zero content of said test step of said test pattern; comparator means coupled to said m output terminals of said device under test and to said system controller, for accepting the output of the device under test and the expected Result Data from said System Controller, and rendering to said System Controller Pass-/Fail Test Data pertaining to the device of under test.

8. A test method for testing a Large Scale Integration Logic Device having n input terminals and m output terminals where n and m are respectively any integer number in the range of ten through three thousand, said method comprising the steps of:
   a. generating *t* discrete logical one electrical manifestations and *s* discrete logical zero electrical manifestations, where *s* and *t* are respectively integer numbers in the range of zero to 2,000, the sum of *s* and *t* being equal to *n*, and for each step of a test pattern the absolute value of *t* being dictated by the truth table for the device under test;
   b. electrically modifying *v* of said *t* discrete logical one manifestations, where *v* is an integer number having any value within the range of zero through *t*;
   c. electrically modifying *u* of said *s* discrete logical zero manifestations, where *u* is an integer number having any magnitude within the range of zero through *s*;
   d. impressing each of the n electrical manifestations, where said *n* electrical manifestations consists of said *v*, *t-v*, *u* and *s-u* electrical manifestations, on a discrete predetermined one of said n input terminals of said device under test;
   e. comparing the output appearing at said m output terminals, in response to receipt of said n electrical manifestations by said device under test, with a known standard; and,
   f. rendering an electrical manifestation of the result of said comparison of the output of said device under test and said known standard.

9. The test method as recited in claim 8 further characterized by randomly determining the values of *v* and *u*, respectively.

10. The test method as recited in claim 8 further characterized by employing predetermined values of *v* and *u*, respectively, and wherein each of said *v* discrete logical one electrical manifestation results from the modification of a predetermined one of said *t* discrete logical one electrical manifestations and each of said *u* discrete logical zero electrical manifestations results from the modification of a predetrmined one of said s discrete logical zero manifestations.

11. The test method as recited in claim 8 further characterized by said *v* discrete logical one electrical manifestations being respectively at a first electrical potential, said *t-v* discrete logical one electrical manifestations being respectively at a second electrical potential, said *u* discrete logical zero electrical manifestations being respectively at a third electrical potential, and said *s-u* discrete logical zero electrical manifestations being respectively at a fourth electrical potential, where said first, second, third and fourth electrical potentials are respectively unequal one to another in magnitude.

12. The test method as recited in claim 8 further characterized by said *v* discrete logical one electrical manifestations being respectively a first electrical potential varying in magnitude in a predetermined manner during a test time period $t_1$, said *t-v* discrete logical one electrical manifestations being respectively a second electrical potential non-variant in magnitude during said time period $t_1$, said u discrete logical zero electrical manifestations being respectively at a third electrical potential varying in magnitude in a predetermined manner during said time period $t_1$, and said *s-u* discrete logical zero electrical manifestations being respectively at a fourth electrical potential non-variant in magnitude during said time period $t_1$, where said first, second, third and fourth electrical potentials are respectively unequal, one to one another, in magnitude during said time period $t_1$ and said time period $t_1$ is small portion of a second.

13. The test method as recited in claim 8 further characterized by said *v* discrete logical one electrical manifestations being respectiveley at a MOST POSITIVE UP LEVEL electrical potential, said *t-v* discrete logical one electrical manifestations being respectively at a LEAST POSITIVE UP LEVEL electrical potential, said *u* discrete logical zero electrical manifestations being respectively at a LEAST NEGATIVE DOWN LEVEL electrical potential, and said *s-u* discrete logical zero electrical manifestations being respectively at a MOST NEGATIVE DOWN LEVEL electrical potential.

14. In an electronic test system for testing high circuit density devices, said devices having *n* input pins and *m* output pins, where *n* and *m* are respectively integer numbers each having any value in the range of 10 through 3,000, said system including: first means for presenting, during each successive time period of a plurality of time periods during the test time for one device, a binary word having n binary bit positions where each bit position has an electrical manifestations denoting the presence of either a binary one or a binary zero; a pin driver circuit for each of said n binary bit positions, each said pin driver circuit including second means for electrically manifesting either a Low command or a High command, and each said driver circuit including third means coupled to said first and second means, and adapted to receive said electrical manifestation of either a binary one or a binary zero corresponding a particular bit position of said n binary bit position word, said third means having an output terminal for rendering any one and only one of four possible electric output manifestations, said four possible electrical output manifestations being respectively High one, Low one, High zero, and Low zero, whereby said High one is electrically manifested at said output terminal of said third means in response to receipt of a High command and a binary one by said third means, said Low one is electrically manifested at said output terminal of said third means in response to receipt of a Low command and a binary one by said third means, said High zero is electrically manifested at said output terminal of said third means in response to receipt of a High command and a binary zero by said third means, and said Low zero is electrically manifested at said output terminal of said third means in response to receipt of a Low command and a binary zero by said third means.

15. In an electronic test system as claimed in claim 14 where said second means includes a bistable device having first and second states, whereby said second means electrically manifests a High command when said bistable device is in said first state and said second means electrically manifests said Low command when said bistable device is in said second state.

16. In an electronic test system as claimed in claim 15 wherein random means is provided for randomly determining the state of said bistable device during each of said successive time periods.

17. In an electronic test system as claimed in claim 15 wherein additional means is provided for setting said bistable device in either said first state or said second state, as desired, during each of said successive time periods.

18. In an electronic test system for testing high circuit density devices, said devices having $n$ input pins and $m$ output pins, where $n$ and $m$ are respectively any integer number in the range of 10 through 3,000, said system including: first circuit means for accepting either a first electrical manifestation representative of a logical one, or a second electrical manifestation representative of a logical zero; controllable second circuit means cooperating with said first circuit means for rendering either a third electrical manifestation representative of a logical one, or a fourth electrical manifestation representative of a logical one in response to receipt of said first electrical manifestation representative of a logical one by said first circuit means; controllable third circuit means cooperating with said first means for rendering either a fifth electrical manifestation representative of a logical zero, or a sixth electrical manifestation representative of a logical zero in response to receipt of said second electrical manifestation respresentative of a logical zero by said first means; and settable control circuit means for controlling said second controllable circuit means and said third controllable circuit means, whereby under control of said settable control circuit means a logical one will be represented by either a third electrical manifestation, or a fourth electrical manifestation, and a logical zero will be represented by either a fifth electrical manifestation or a sixth electrical manifestation, under control of the setting of said settable control circuit means.

19. In an electronic test system as claimed in claim 18 the provision of random means for randomly setting said settable control means in either one of two states, whereby when said settable control means is set to said first state said controllable second circuit means renders said third electrical manifestation representative of a logical one in response to receipt of said first electrical manifestation representative of a logical one by said first circuit means, and said controllable third circuit means renders said fifth electrical manifestation representative of a logical zero in response to receipt of said second electrical manifestation representative of a logical zero by said first circuit means, and when said settable control means is set to said second state said controllable second circuit means renders said fourth electrical manifestation representative of a logical one in response to receipt of said first electrical manifestation representative of a logical one by said first circuit means, and said controllable third circuit means renders said sixth electrical manifestation representative of a logical zero in response to receipt of said second electrical manifestation representative of a logical zero by said first circuit means.

20. In an electronic test system as claimed in claim 18 the provision of control means for setting said settable control means in either one of two states, whereby when said settable control means is set to said first state said controllable second circuit means renders said third electrical manifestation representative of a logical one in response to receipt of said first electrical manifestation representative of a logical one by said first circuit means, and said controllable third circuit means renders said fifth electrical manifestation representative of a logical zero in response to receipt of said second electrical manifestation representative of a logical zero by said first circuit means, and when said settable control means is set to said second state said controllable second circuit means renders said fourth electrical manifestation representative of a logical one in response to receipt of said first electrical manifestation representative of a logical one by said first circuit means, and said controllable third circuit means renders said sixth electrical manifestation representative of a logical zero in response to receipt of said second electrical manifestation representative of a logical zero by said first circuit means.

21. In an electronic test system as claimed in claim 20: $n$ electronic channels, each of said $n$ electronic channels including said first circuit means, said controllable second circuit means, said controllable third circuit means, said settable control circuit means and said control means; and $n$ connection means for connecting each of said $n$ electronic channels to a predetermined discrete one of said $n$ input pins, whereby the particular electrical manifestation impressed on each of said $n$ input pins is determined by the particular electrical manifestation impressed on said first circuit means and the status of said control means of the electronic channel connected to said input pin.

22. In an electronic test system for testing high density logic networks having $n$ input pins and $m$ output pins, where $n$ and $m$ are integer numbers respectively having any value in the range of 10 through 3,000, a pin driver circuit comprising: a first bistable device having an input terminal and an output terminal, said first bistable device having a first state and a second state of conductivity and being adapted to electrically manifest at said output a High command representative of said first state and a Low command representative of said second state; a second bistable device having first and second input terminals and first and second ouput terminals, said second bistable device having first and second states of conductivity; a third bistable device having first and second input terminals and first and second output terminals, said third bistable device having first and second states of conductivity; means connecting said output terminal of said first bistable device to said first input terminal of said third bistable device; data source means for impressing on said first input terminal of said second bistable device an electrical manifestation of a logical one, or an electrical manifestation of a logical zero; means connected to said input of said first bistable device for causing said device to assume said first state or said second state, said first bistable device electrically manifesting a High command when in said first state, and electrically manifesting a Low command when in said second state; a source of timing signals connected to said second input terminals of said second and third bistable devices, respectively, whereby in response to a timing signal, said second bistable device will assume its first state in response to a logical one and its second state in response to a logical zero, and said third bistable device will assume its first state in response to said High command and its second state in response to said Low command; a first AND circuit having an output, a first input connected to said first output terminal of said second bistable device, and a second input connected to said first output terminal of said third bistable device, a second AND circuit having an output, a first input connected to said first output terminal of said second bistable device and a second input connected to said second output of said third bistable device, a third AND circuit having an output, a first input connected to said second output terminal of said second bistable device and a second input connected to said first output terminal of said third bistable device, and a fourth AND circuit having an output, a first input connected to said second output terminal of said second bistable device, and a second input connected to said second output terminal of said third bistable device, whereby said output of said first AND circuit electrically manifests a High-One Select Command when said second and third bistable devices are respectively in said first state, said output of said second AND circuit electrically manifests a Low-One Select Command when said second bistable device is in said first state and said third bistable device is in said second state, said output of said third AND circuit electrically manifests a High-Zero Select Command when said second bistable device is in said second state and third bistable device is in said first state, and said output of said fourth AND circuit electrically manifests a Low-Zero Select Command when said second bistable device is in said second state, and said third bistable device is in said second state; Operational Amplifier means having an input terminal and an output terminal; first field effect transistor switch means interconnecting said output terminal of said first AND circuit and said input terminal of said Operational Amplifier means, second field effect transistor switch means interconnecting said output terminal of said second AND circuit and said input terminal of said Operational Amplifier means; third field effect transistor switch means interconnecting said output terminal of said third AND circuit and said input terminal of said Operational Amplifier means, and fourth field effect transistor switch means interconnecting said output terminal of said fourth AND circuit and said input terminal of said operational amplifier means, whereby, in response to said High-One Select Command said first field effect transistor switch means is activated and a High logical one electrical manifestation appears at said output terminal of said Operational Amplifier means, in response to said Low-One Select Command, said second field effect transistor switch means is activated and a Low logical one electrical manifestation appears at said output terminal of said Operational Amplifier means, in response to said High Zero Select Command, said third field effect transistor switch means is activated and a High logical zero electrical manifestation appears at said output terminal of said Operational Amplifier means and in response to said Low Zero Select Command said fourth field effect transistor switch means is activated and a Low logical zero electrical manifestation appears at said output terminal of said Operational Amplifier means.

23. A pin driver circuit as claimed in claim 22 wherein said means connected to said first bistable device for causing said device to assume said first state or said second state, comprises random pulse generator means, whereby said first bistable device randomly assumes said first or second states.

24. A pin driver circuit as claimed in claim 23 wherein additional means is provided for selectively overriding said pulse generator means, and affirmatively selecting either said first state or said second state of said first bistable device.

25. In an electronic tester as claimed in claim 22 wherein additional means is provided for sensing and storing an electrical manifestation representative of the state, first or second, of said first bistable device.

26. In a tester for testing large scale integration devices having $m$ input terminals, where $m$ is an integer greater in magnitude than 10, said tester including: first means for providing m electrical manifestations; second means cooperating with said first means for randomly applying a first electrical manifestation, or a second electrical manifestation, on each of certain ones of said m input terminals; third means cooperating with said first means for randomly applying a third electrical manifestation, or a fourth electrical manifestation on each of the remaining ones of said m input terminals; and additional means cooperating with said first, second and third means for sensing and storing data indicative of exactly which one of said four electrical manifestations has been impressed on each of said m terminals.

27. In a tester as claimed in claim 26 wherein said first, second, third and fourth electrical manifestations are respectively unequal in voltage magnitude, said first and second electrical manifestations respectively represent logical ones, said third and fourth electrical manifestations respectively represent logical zeros, said first means and said second means each contain bistable devices, and said additional means senses the state of certain ones of said bistable devices and stores a manifestation representing the state of each of said certain ones of said bistable devices.

28. In a tester for testing large scale integration devices having $m$ input terminals, where $m$ is an integer greater in magnitude than 10, said tester including: first means for providing m electrical manifestations; second means cooperating with said first means for applying first electrical manifestations varying in voltage magnitude between a first value and a second value on each of certain preselected ones of said m input terminals; third means cooperating with said first means for applying second electrical manifestations varying in voltage magnitude between a third value and a fourth value on each of the remaining ones of said m input terminals, and wherein each of said first electrical manifestations vary in magnitude independently with respect to time, each of said second electrical manifestations vary independently with respect to time, and said first, second, third and fourth values of voltage magnitude are respectively unequal.

29. In a tester as claimed in claim 28 wherein said first electrical manifestations respectively represent logical ones, said second electrical manifestations respectively represent logical zeros and said variation in voltage magnitude of said first electrical manifestations and said second electrical manifestations are produced by a plurality of independent random pulse generator means.

30. In an electronic test system for testing high density logic networks having *n* input pins, where *n* is an integer having any value in the range of 10 through 3,000, a pin driver circuit comprising: a first bistable device having an input terminal and first and second output terminals, said first bistable device having a first state and a second state of conductivity and being adapted to electrically manifest at said outputs a High command representative of said first state and a Low command representative of said second state; a second bistable device having first and second input terminals and first and second output terminals, said second bistable device having first and second states of conductivity; data source means for impressing on said first input terminal of said second bistable device an electrical manifestation of a logical one, or an electrical manifestation of a logical zero; random noise source means connected to said input of said first bistable device for causing said device to non-periodically assume said first and second states, said first bistable device electrically manifesting a High command when in said first state, and electrically manifesting a Low command when in said second state; a source of timing signals connected to said second input terminal of said second bistable device, whereby in response to a timing signal, said second bistable device will assume its first state in response to a logical one and its second state in response to a logical zero; a first AND circuit having an output, a first input connected to said first output terminal of said second bistable device, and a second input connected to said first output terminal of said first bistable device; a second AND circuit having an output, a first input connected to said first output terminal of said second bistable device and a second input connected to said first output of said first bistable device; a third AND circuit having an output, a first input connected to said second output terminal of second bistable device and a second input connected to said second output terminal of said first bistable device; and a fourth AND circuit having an output, a first input connected to said second output terminal of said second bistable device, and a second input connected to said second output terminal of said first bistable device, whereby said output of said first AND circuit electrically manifests a High-One varying potential when said second bistable device is in said first state, said output of said second AND circuit electrically manifests a Low-One varying potential when said second bistable device is in said first state, said output of said third AND circuit electrically manifests a High-Zero varying potential when said second bistable device is in said second state, and said output of said fourth AND circuit electrically manifests a Low-Zero varying potential when said second bistable device is in said second state; Operational Amplifier means having an input terminal and an output terminal; first field effect transistor switch means interconnecting said output terminal of said first AND circuit and said input terminal of said Operational Amplifier means, second field effect transistor switch means interconnecting said output terminal of said second AND circuit and said input terminal of said Operational Amplifier means; third field effect transistor switch means interconnecting said output terminal of said third AND circuit and said input terminal of said Operational Amplifier means, and fourth field effect transistor switch means interconnecting said output terminal of said fourth AND circuit and said input terminal of said operational amplifier means, whereby, in response to said High-One varying potential and said Low-One varying potential said first and second field effect transistor switch means are respectively activated and a varying non-periodic High-Low logical one electrical manifestation appears at said output terminal of said Operational Amplifier, in response to said High Zero varying electrical potential and said Low-Zero varying potential, said third and fourth field effect transistor switch means are respectively activated and a varying non-periodic High-Low logical zero electrical manifestation appears at said output terminal of said Operational Amplifier.

* * * * *